G. E. RIBLET.
VEHICLE WHEEL.
APPLICATION FILED DEC. 3, 1919.

1,414,043.

Patented Apr. 25, 1922.
2 SHEETS—SHEET 1.

Witnesses:
Sully Russ
L. Belle Weaver

INVENTOR.
George E. Riblet
BY
Frederick Whyte
ATTORNEY

REISSUED
AS NO.16765
OCT 11 1927

G. E. RIBLET.
VEHICLE WHEEL.
APPLICATION FILED DEC. 3, 1919.

1,414,043.

Patented Apr. 25, 1922
2 SHEETS—SHEET 2.

Witnesses:
Sully Russo
L. Belle Weaver

INVENTOR.
George E. Riblet
BY
Frederick Whyper
ATTORNEYS.

UNITED STATES PATENT OFFICE.

GEORGE E. RIBLET, OF LONG BEACH, CALIFORNIA.

VEHICLE WHEEL.

1,414,043.  Specification of Letters Patent.  Patented Apr. 25, 1922.

Application filed December 3, 1919. Serial No. 342,251.

*To all whom it may concern:*

Be it known that I, GEORGE E. RIBLET, a citizen of the United States, residing at Long Beach, in the county of Los Angeles and State of California, have invented a new and useful Vehicle Wheel, of which the following is a specification.

This invention relates to separable pressed steel wheels and is more particularly directed to wheels of this character which are especially adapted for use on automobiles and aeroplanes.

The object of the invention is to produce a wheel structure in which the several components may be readily disassembled and replaced and in which the wheel rim has a positive driving connection with the body of the wheel.

A further object is to provide a wheel combining a rim and opposed circular dished body members having contractile peripheral portions adapted to readily engage the rim and to be expanded to clampingly engage the rim.

Another object is to so construct the body members as to permit their proper engagement with the rim without distortion and without the necessity of being sprung or forced into place.

Various other objects including those of simplicity, strength, lightness of construction and cheapness of manufacture will be more fully apparent from the following description of the accompanying drawings which form a part of this disclosure and which illustrate a preferred form of embodiment of the invention.

Figure 1:
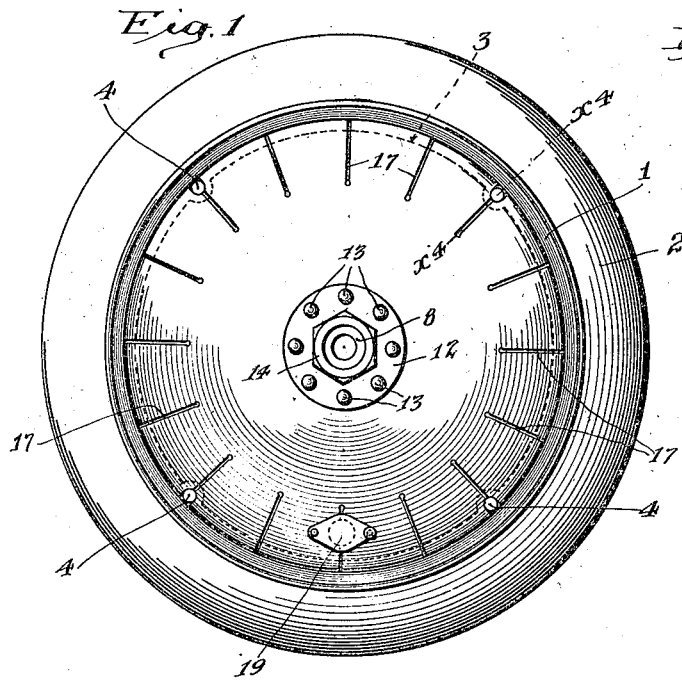
Figure 1 is a side elevation of my improved wheel structure as utilized for an automobile or aeroplane wheel.
Figure 2:
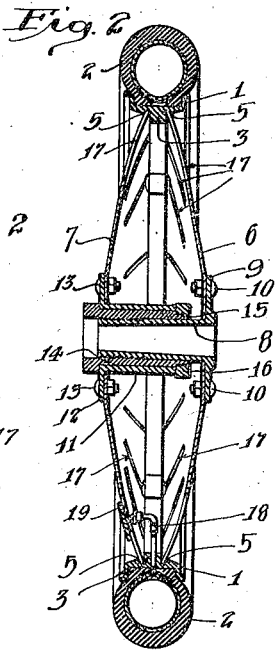
Fig. 2 is a central transverse section.
Figure 3:
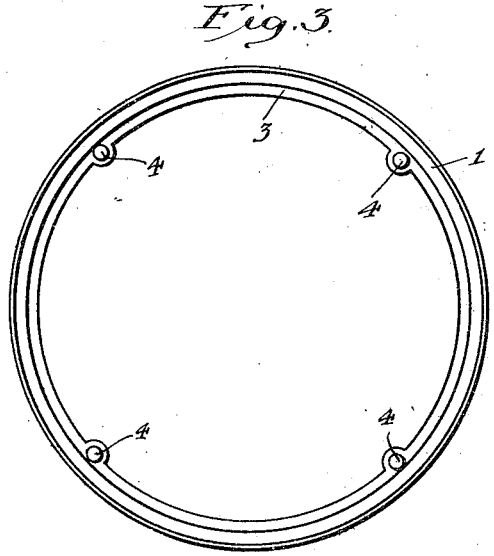
Fig. 3 is a side elevation of the rim member.
Figure 4:
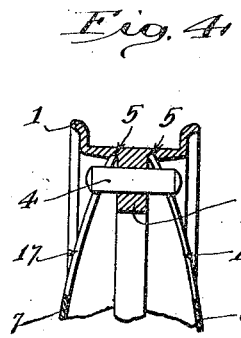
Fig. 4 is a detailed section on line $x^4-x^4$ of Fig. 1.

Referring to Figs. 1 to 4, the rim 1 of the wheel has a peripheral channel adapted to receive the tire 2, and a medial rib 3 which carries a plurality of driving studs 4. Said studs are rigidly secured in the rib 3, in the present instance by having a drive fit in their receiving orifices in the rim and being pressed or driven into place, and project on opposite sides of the rib. (See Fig. 4.)

On either side of the rib 3, at the juncture of said rib with the rim 1, there are formed grooves 5—5 for receiving the peripheral edges of the side members of the wheel, as will later be explained.

The side members of the wheel are formed preferably of sheet steel and comprise dished circular disks 6—7 which together with their complementary hub elements, as separate units, are each removable with respect to the rim 1 and to the opposed side member. The disk 6 has a medial aperture adapted to receive a flanged bearing hub 8 with the flange 9 thereof secured to the disk by bolts 10. The disk 7 also has a medial orifice to receive a flanged sleeve 11 which extends inwardly with its flange 12 secured to the disk by bolts 13. A revolvable sleeve 14 has a peripheral shoulder at one end and at the opposite end has a screw threaded portion 15 of reduced diameter.

The sleeve 14 is rotatable within the flanged sleeve 11 of the disk 7 with the sleeve 11 positioned to engage the shoulder of the sleeve 14 and retained in position by a collar or nut 16 which is screw-threaded on the inner end of the sleeve 14.

A portion of the inner periphery of the sleeve 14 and a portion of the outer periphery of the hub 8 are threaded for co-operative engagement and the outer end of the sleeve 14 is contoured to receive a wrench or other tool suitable for rotating said sleeve. (See Fig. 1.)

Each disk 6—7 is provided with a series of radial slots 17 extending inwardly from its peripheral edge and dividing the peripheral portions of the disk into a plurality of transversely flexible segments. Certain of these slots are enlarged at the periphery of the disks for engagement with the driving studs 4 of the wheel rim.

Before the disks are assembled with the rim, their peripheral segmental portions are contracted, by the inherent tension of the metal, with the slots 17 nearly closed at the periphery of the disks, providing disks of minimum diameter for assembling with the rim without distortion.

The rim 1 has a radial aperture to accommodate an air valve 18 of the tire 2 and one of the disks is apertured to afford access to said valve, said aperture being normally closed by a cover plate 19.

In assembling the several components of the wheel, the two side or disk members are brought together from opposite sides of the wheel rim with the bearing hub 8 of the disk 6 engaging into the revolvable sleeve 14 of the disk 7 and the peripheral edges of both disks engaging their respective grooves 5—5 of the wheel rim. By reason of the normal contracted condition of the peripheral portion of the disks, their edges can readily be engaged with their companion grooves of the rim without initial distortion of the disks and without the use of tools.

To clamp the parts together, the revolvable sleeve 14 is screwed upon the bearing hub 8, drawing the medial portions of the opposed disks together and expanding the peripheral portions of the disks to clampingly engage into the grooves 5—5 of the rim 1.

This structure provides disks or side members having contractile peripheral portions and provides also a quick demountable wheel having positive driving connection between the rim and hub.

Figure 5:
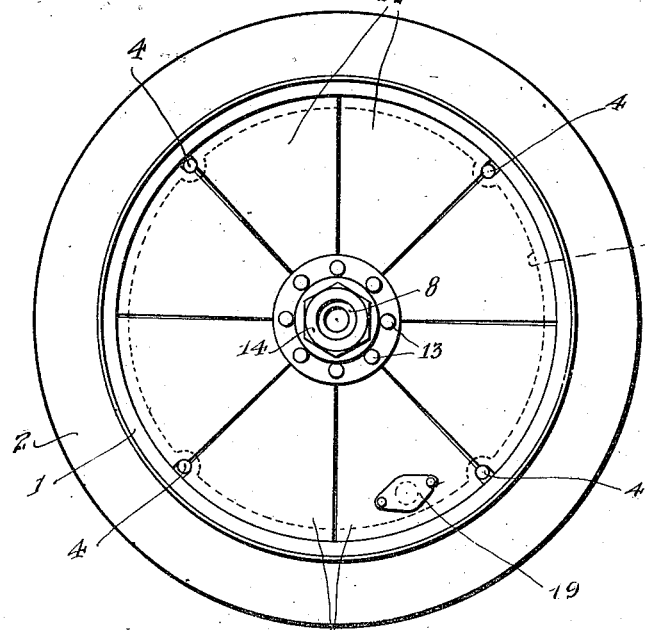
Fig. 5 is a side elevation of a wheel having a modified form of side or body member.
Figure 6:
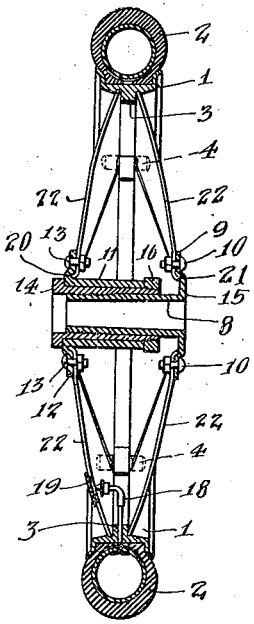
Fig. 6 is a central transverse section through the wheel shown in Fig. 5.
Figure 7:
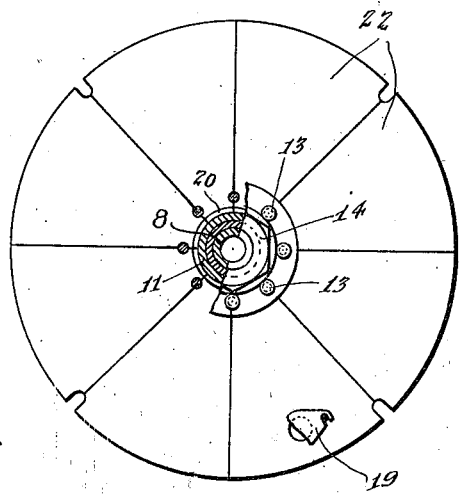
Fig. 7 is a detailed elevation of the modified form of side member, detached from the rim.

In the modified form illustrated in Figs. 5 to 7, the rim is of the same construction as that shown in Figs. 1 to 4, and the hub elements have only a slight change in contour to provide annular shoulders 20—21 affording an anchorage for the side members. The side members, in this instance, are formed of a plurality of segmental plates 22 having outwardly flanged inner ends contoured to engage beneath the shoulders 20—21. (See Fig. 6).

The plates are contoured to form complete circular disk members, the adjacent edges forming radial slots, with certain edges notched to provide for engagement with the driving studs of the rim.

Near their inner ends the plates have opposed notches forming orifices for the accommodation of the bolts 10—13.

With the side members removed, the plates 22 contract to close the radial slots, (see Fig. 7), providing side members of minimum diameter for easy assembling with the rim.

Figure 8:
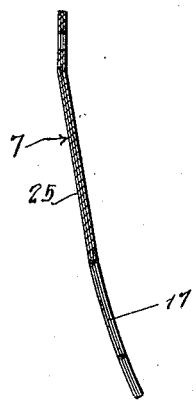
Fig. 8 is a partial sectional view of a laminated side member formed of a plurality of relatively thin sheet metal members.

The side member illustrated in Fig. 8 is formed of a plurality of relatively thin sheet metal laminations 25. This construction enables a variation to be made in the strength of the wheel, it being possible, when a wheel of greater strength is required, to assemble a greater number of laminations in the structure and reversely, when it is desired to produce a wheel of lesser strength and greater inherent resiliency a lesser number of laminations will be incorporated therein.

I claim:

1. A vehicle wheel combining a rim having a plurality of transverse driving studs, opposed circular side members having radially disposed peripheral slots dividing the peripheral portions of the side members into segments adapted to engage the rim, certain of said slots being enlarged for engagement with the driving studs, and means operable to draw the side members together to flex the segments to clamping engagement with the rim.

2. A vehicle wheel combining a rim having a plurality of transverse driving studs and opposed internal annular grooves, opposed circular side members expansible to engage the grooves and notched for engagement with the driving studs, a fixed bearing hub carried by one side member, and a revolvable sleeve carried by the opposite member and cooperating with the bearing hub to expand the side members to clampingly engage the rim within the annular grooves.

3. A vehicle wheel combining a rim having a plurality of transverse driving studs, opposed side members each comprising a stationary hub member and a plurality of sector plates attached thereto and peripherally notched for engagement with said studs, and a revolvable sleeve journaled in one hub member and cooperating with the opposite hub member to force the peripheral edges of the sector plates into clamping engagement with the rim.

4. A vehicle wheel combining a rim having an internal annular medial rib and a plurality of transverse driving studs, opposed circular side members positioned respectively on opposite sides of said rib with their peripheral edges seated at the juncture of said rib and rim, the side members having peripheral notches engaging the studs, a stationary hub member projected inwardly from one side member, and a revolvable member journaled in and projected inwardly from the opposite side member and cooperating with the stationary hub member to draw the side members together to clampingly engage their peripheral edges with the rim.

Signed at Los Angeles, California, this 24th day of November, 1919.

GEORGE E. RIBLET.

Witnesses:
CLARENCE B. FOSTER,
L. BELLE WEAVER.